T. RUPP.
CAN SERVER.
APPLICATION FILED NOV. 26, 1919.
1,364,889.
Patented Jan. 11, 1921
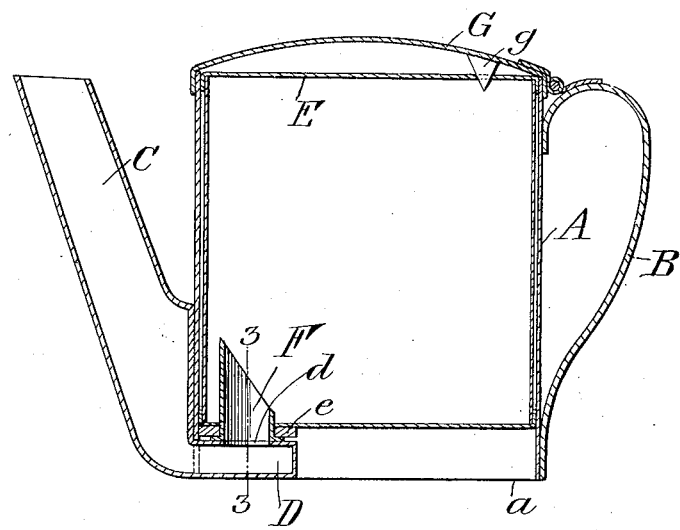
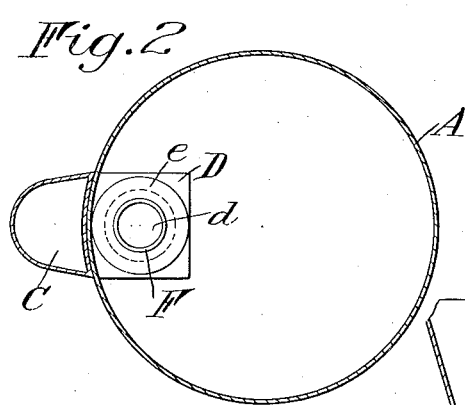
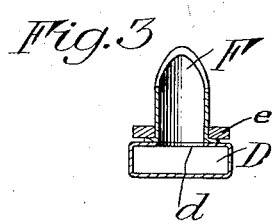
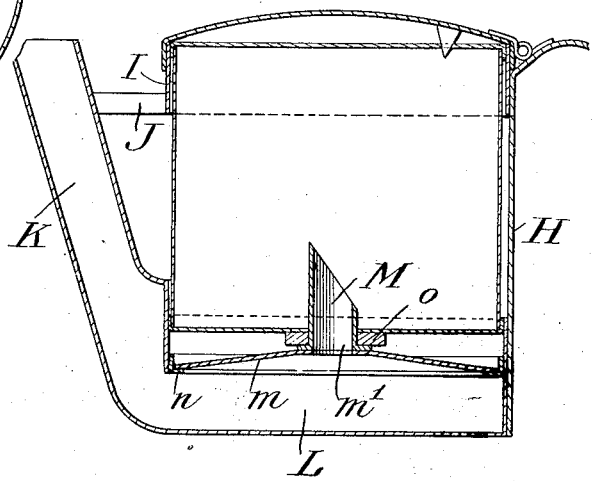
INVENTOR
Theodore Rupp
BY Harold E. Stonebraker
his ATTORNEY

UNITED STATES PATENT OFFICE.

THEODORE RUPP, OF ROCHESTER, NEW YORK.

CAN-SERVER.

1,364,889. Specification of Letters Patent. Patented Jan. 11, 1921.

Application filed November 26, 1919. Serial No. 340,868.

*To all whom it may concern:*

Be it known that I, THEODORE RUPP, a subject of the German Empire, residing at Rochester, in the county of Monroe, and State of New York, have invented certain new and useful Improvements in Can-Servers of which the following is a specification.

My invention relates to a can server, and the purpose is to provide an economical, practical, and efficient device for receiving a can of liquid, such as condensed milk, syrup, or other substance, and automatically puncturing the can, and permitting its contents to be poured therefrom in a convenient manner.

In a more particular aspect, the improvement is designed to puncture a can as the latter is dropped into its holder and reaches the limit of its downward movement, this preferably being accomplished by puncturing means located at the bottom of the holder.

Another object of the invention is to afford an efficient form of knife for the puncturing means, and to provide proper communication between the knife and the pouring spout, all of the parts being arranged and related so as to make the device as light in weight as possible, and to require a minimum amount of metal.

The invention also consists of other detailed improvements, which will be understood from the following description, when read in conjunction with the accompanying drawings, the features of novelty being pointed out in the claims at the end of the specification.

In the drawings:

Figure 1 is a vertical sectional view illustrating a practical adaptation of the invention;

Fig. 2 is a plan view with the cover removed;

Fig. 3 is a detailed sectional view on line 3—3 of Fig. 1, and

Fig. 4 is a vertical sectional view of a modified form of the invention.

In the preferred form of illustrated embodiment, disclosed in Figs. 1 to 3 inclusive, A designates the holder or support, which may be of cylindrical form, as shown in Fig. 1, or of skeleton form as shown in Fig, 4, and B designates the handle which is secured to the holder or body A.

Attached to one side of the holder is the pouring spout C, and communicating with the spout C is a chamber D, preferably formed integral therewith, and extending beneath the space occupied by the can E when the latter is in position for serving, as illustrated in Fig. 1. The chamber D has an opening $d$ in its upper wall, and arranged above said chamber and opening is the can puncturing means, preferably consisting of a tubular knife F. The knife F is supported upon the chamber D, but may be otherwise mounted at the bottom of the holder, so as to engage and puncture a can when the latter is dropped within the holder. The upper or cutting edge of the knife is arranged diagonally with reference to the bottom of the inserted can, so as to present a sharp, shearing, puncturing edge, and thereby easily effect the required opening in the can. A washer or gasket $e$ of rubber, or other similar substance, may be positioned around the tubular knife to engage the adjacent surface of the can and make a tight joint with the opening produced by the knife.

The bottom edge $a$ of the holder is located beneath the puncturing means, as shown in Fig. 1, and together with the bottom of the chamber D, constitutes a support for the server. In order to reduce the space between the bottom of the can and the bottom of the holder to a minimum, the chamber D is formed relatively wide and shallow, as illustrated in Fig. 3. In this manner, the height of the chamber D is lessened, while its increased width affords sufficient volume to receive the liquid which comes from the can through the tubular knife F.

G designates the cover which is hinged to the holder A and carries a knife $g$, adapted to puncture the top of the can when the cover is closed, and thereby provide an air vent, as usual in this class of devices. The cover may be held in closed position to retain the can in place, either frictionally or by any suitable retaining means.

Fig. 4 shows a modification of the invention, in which the holder consists of a skeleton frame including a vertical portion H having attached thereto at the upper end a band I, while J is a strip or brace connecting the band I and the spout K. The spout K is connected with a chamber L which extends entirely beneath can and holder. The puncturing means comprises a tubular knife M located centrally of the holder, and mounted upon a yieldable disk or plate $m$. The plate $m$ has an opening $m'$ communicating with the knife M, and is supported at its outer edges upon a shoulder or flange n. The arrangement is such that as a can is dropped into the holder, and pressed upon the knife M, the latter is forced slightly in a downward direction together with the plate m, and the outer edges of the plate m are thereby forced toward the adjacent wall of the retaining flange, forming a tight joint with the holder. There is preferably provided a washer o located around the knife M and above the plate m, and acting to receive the bottom of a can and to provide a tight joint with the can around the opening produced by the puncturing means.

It is to be understood that the invention is not limited to the particular structures herein shown, but may be otherwise modified without departing from the underlying features of the improvement, as set forth in the following claims.

I claim:—

1. In a can server, the combination with a tubular holder for the can having an open top and a bottom support, of a spout permanently and rigidly fixed to the holder to extend upwardly along the side thereof and also beneath the bottom and communicating with the interior of the holder through the latter and a can puncturing element on the bottom at such point of communication.

2. In a can server, the combination with a tubular holder for the can having an open top and a bottom support, of a spout permanently and rigidly fixed to the holder to extend upwardly along the side thereof and also beneath the bottom and communicating with the interior of the holder through the latter, a can puncturing element on the bottom at such point of communication and a hinged cover for the holder adapted to maintain a can impaled upon the puncturing device.

3. In a can server, the combination with a tubular holder for the can having an open top, a bottom support and a base below the bottom spacing the latter from a supporting surface, of a spout permanently and rigidly fixed to the holder to extend upwardly along the side thereof and also beneath the bottom and communicating with the interior of the holder through the latter, and a can puncturing element on the bottom at such point of communication.

4. A can server comprising a holder, can puncturing means located at the bottom of the holder so as to puncture a can as it is dropped into the holder, and a spout located at one side of the holder and communicating with said puncturing means.

5. A can server comprising a holder, can puncturing means consisting of a tubular knife located at the bottom of the holder so as to puncture a can as it is dropped into the holder, and a spout located at one side of the holder and communicating with said can puncturing means.

6. A can server comprising a holder, can puncturing means located at the bottom of the holder so as to puncture a can when it is dropped into the holder, and a spout located at one side of the holder and communicating with said puncturing means through a relatively wide and shallow chamber located under the puncturing means.

7. A can server comprising a holder, can puncturing means consisting of a tubular knife located at the bottom of the holder so as to puncture a can when it is dropped into the holder, and a spout located at one side of the holder and having formed integral therewith a relatively wide and shallow chamber located under said tubular knife and communicating therewith.

8. A can server comprising a holder adapted to receive a can, and can puncturing means acting automatically to puncture the can as the latter reaches the limit of its downward movement in the holder.

In witness whereof I have hereunto signed my name.

THEODORE RUPP.